(12) United States Patent
Yang et al.

(10) Patent No.: US 11,768,113 B2
(45) Date of Patent: Sep. 26, 2023

(54) LIGHT PULSE SIGNAL PROCESSING SYSTEM COMPRISING A CYLINDRICAL LENS TO PROVIDE A SIGNAL LIGHT PULSE HAVING A SPATIAL ANGLE CHIRP INCIDENT ON A PAIR OF LONG MIRRORS AT DIFFERENT ANGLES

(71) Applicant: SOUTH CHINA UNIVERSITY OF TECHNOLOGY, Guangzhou (CN)

(72) Inventors: Zhongmin Yang, Guangzhou (CN); Xiaoxiao Wen, Guangzhou (CN); Wei Lin, Guangzhou (CN); Xiaoming Wei, Guangzhou (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 212 days.

(21) Appl. No.: 17/436,789

(22) PCT Filed: Apr. 30, 2020

(86) PCT No.: PCT/CN2020/088424
§ 371 (c)(1),
(2) Date: Sep. 7, 2021

(87) PCT Pub. No.: WO2021/203499
PCT Pub. Date: Oct. 14, 2021

(65) Prior Publication Data
US 2022/0326087 A1 Oct. 13, 2022

(30) Foreign Application Priority Data
Apr. 9, 2020 (CN) .......................... 202010274675.0

(51) Int. Cl.
*G01J 11/00* (2006.01)
*G02F 1/35* (2006.01)
*G02B 27/14* (2006.01)

(52) U.S. Cl.
CPC .............. *G01J 11/00* (2013.01); *G02B 27/14* (2013.01); *G02F 1/353* (2013.01); *G02F 1/3503* (2021.01)

(58) Field of Classification Search
CPC .. G01J 11/00; G01J 1/42; G02B 27/10; G02B 27/09; G02F 1/35; H01S 3/00
(Continued)

(56) References Cited

U.S. PATENT DOCUMENTS 10,211,587 B2 * 2/2019 Tsia ................... G02B 21/0084

FOREIGN PATENT DOCUMENTS

| CN | 107534261 A | 1/2018 |
| CN | 109084906 A | 12/2018 |

(Continued)

OTHER PUBLICATIONS

International Search Report for Application No. PCT/CN2020/088424 dated Jan. 1, 2015, 5 pages.
(Continued)

*Primary Examiner* — Que Tan Le
(74) *Attorney, Agent, or Firm* — Seyfarth Shaw LLP

(57) ABSTRACT

The present application relates to a light pulse signal processing system. A to-be-measured signal light source generates a to-be-measured signal light pulse, and the to-be-measured signal light pulse is transmitted to a cylindrical lens. The to-be-measured signal light pulse is converted into a to-be-measured signal light pulse having a spatial angle chirp by the cylindrical lens, and is outputted and is incident into a pair of long mirrors at different angles. The to-be-measured signal light pulse incident at different incident angles is delayed by the pair of long mirrors. A cluster of to-be-measured signal light pulses with a corresponding repetition rate is outputted to a beam combining mirror, and is combined with a cluster of reference light pulses by the (Continued)

beam combining mirror. A light signal analysis device analyzes the combined cluster of light pulses.

10 Claims, 4 Drawing Sheets

(58) Field of Classification Search
USPC .............................................. 250/216, 214.1
See application file for complete search history.

(56) References Cited

FOREIGN PATENT DOCUMENTS

| CN | 110567595 A | 12/2019 |
|---|---|---|
| JP | 2004340812 A | 12/2004 |
| WO | 2013152781 A1 | 10/2013 |

OTHER PUBLICATIONS

Written Opinion for Application No. PCT/CN2020/088424 dated Jan. 7, 2021, 4 pages.

* cited by examiner

LIGHT PULSE SIGNAL PROCESSING SYSTEM COMPRISING A CYLINDRICAL LENS TO PROVIDE A SIGNAL LIGHT PULSE HAVING A SPATIAL ANGLE CHIRP INCIDENT ON A PAIR OF LONG MIRRORS AT DIFFERENT ANGLES

CROSS REFERENCE TO RELATED APPLICATIONS

This is a U.S. National Stage application of, and claims priority to, PCT/CN2020/088424, filed Apr. 30, 2020, which further claims priority to Chinese Patent Application No. 202010274675.0, filed Apr. 9, 2019, the disclosures of which are incorporated herein by reference in their entirety.

TECHNICAL FIELD

The present application relates to the technical field of signal measurement, and more particularly, to a light pulse signal processing system.

BACKGROUND

Ultrafast pulse laser has been extremely widely applied in various disciplines because of characteristics of short duration, high peak power, spectral width, etc.. In researches on the ultrafast pulse laser, correlation measurements of the ultrafast pulse laser are usually needed. At first, an indirect measurement method, such as an earliest autocorrelation measurement method, is mainly adopted for the measurement of the ultrafast pulse laser, while this method cannot present important information such as an original waveform and a phase of the pulse. This limitation was overcome by a Frequency Resolved Optical Gating (FROG) method, i.e. the FROG method, in 1993. The FROG method also becomes the most common mean in a field of signal measurement.

The FROG method obtains relevant information of the light pulse signal mainly by performing light splitting processing on the signal to be measured. However, the FROG method usually uses a spatial displacement element, which limits the accuracy of the measurement of the light pulse signal, and a low refresh rate for acquiring the signal makes it impossible to realize real-time measurement or to meet measurement requirements of high-repetition rate.

Therefore, a conventional light pulse signal processing system has a defect of low measurement capability.

SUMMARY

Based on the above, it is necessary to provide a light pulse signal processing system capable of improving a measurement capability of the light pulse signal processing system in view of the above technical problem.

A light pulse signal processing system is provided, including: a reference signal light source configured to generate a cluster of reference light pulses having a first repetition rate, a beam combining mirror, a to-be-measured signal light source, a cylindrical lens, and a pair of long mirrors.

The to-be-measured signal light source is configured to generate a to-be-measured signal light pulse and transmit the to-be-measured signal light pulse to the cylindrical lens.

The cylindrical lens is configured to convert the to-be-measured signal light pulse into a to-be-measured signal light pulse having a spatial angle chirp, so that the to-be-measured signal light pulse having the spatial angle chirp is incident on the pair of long mirrors at different angles.

The pair of long mirrors is configured to delay the to-be-measured signal light pulse incident at different angles by means of inter-mirror reflection, and to output a cluster of to-be-measured signal light pulses having a second repetition rate to the beam combining mirror; wherein a rate difference between the second repetition rate and the first repetition rate is less than a set rate difference threshold.

The beam combining mirror is configured to combine the cluster of to-be-measured signal light pulses with the cluster of reference light pulses generated by the reference signal light source, for a light signal analysis device to analyze the combined cluster of light pulses.

In one embodiment, the light pulse signal processing system further includes a unidirectional transmission mirror disposed between the to-be-measured signal light source and the cylindrical lens.

The unidirectional transmission mirror is configured to transmit the to-be-measured signal light pulse generated by the to-be-measured signal light source to the cylindrical lens.

In one embodiment, the pair of long mirrors is further configured to transmit the cluster of to-be-measured signal light pulses to the unidirectional transmission mirror through the cylindrical lens, so that the unidirectional transmission mirror reflects the cluster of to-be-measured signal light pulses to the beam combining lens.

In one embodiment, the pair of long mirrors comprises at least two planar reflective mirrors arranged opposite to each other.

In one embodiment, the light signal analysis device comprises a nonlinear crystal. The nonlinear crystal is configured to convert the combined cluster of light pulses obtained by the beam combining mirror into sum-frequency light, for the light signal analysis device to analyze the sum-frequency light.

In one embodiment, the light signal analysis device further includes a time-domain stretching device.

The time-domain stretching device is configured to perform time-frequency conversion processing on the sum-frequency light obtained by the nonlinear crystal, for the light signal analysis device to analyze the time-frequency converted sum-frequency light signal.

In one embodiment, the light signal analysis device further includes a first lens disposed between the beam combining mirror and the nonlinear crystal.

The first lens is configured to focus the combined cluster of light pulses obtained by the beam combining mirror to the nonlinear crystal.

In one embodiment, the light signal analysis device further includes a second lens disposed between the nonlinear crystal and the time-domain stretching device.

In one embodiment, the second lens is configured to collimate he sum-frequency light obtained from the nonlinear crystal and couple the sum-frequency light obtained from the nonlinear crystal to the time-domain stretching device.

In one embodiment, the light signal analysis device further includes a photodetector. The photodetector is configured to detect the time-frequency converted sum-frequency light signal output by the time-domain stretching device, and convert the time-frequency converted sum-frequency light signal into a corresponding electrical signal.

In one embodiment, the light signal analysis device further includes a sampling device.

The sampling device is configured to perform data acquisition on the electrical signal obtained by the photodetector to obtain a scanning trajectory diagram, and the scanning trajectory diagram is configured for obtaining an intensity and a phase of the to-be-measured signal light pulse in a time domain and/or a frequency domain by a generalized projection method.

According to the light pulse signal processing system, the to-be-measured signal light source generates the to-be-measured signal light pulse, and the to-be-measured signal light pulse is transmitted to the cylindrical lens. The to-be-measured signal light pulse is converted into the to-be-measured signal light pulse having the spatial angle chirp by the cylindrical lens. The to-be-measured signal light pulse having the spatial angle chirp is output and is incident into the pair of long mirrors at different angles. The to-be-measured signal light pulse incident at different incident angles through the pair of long mirrors is delayed by means of inter-mirror reflection. The cluster of to-be-measured signal light pulses with a corresponding repetition rate is outputted to the beam combining mirror. The cluster of to-be-measured signal light pulses and the cluster of reference light pulses are combined by the beam combining mirror. The light signal analysis device may analyze the combined cluster of light pulses. Compared with the conventional light splitting processing performed by using the FROG method, the present solution can realize the processing of the light pulse signal by means of a co-action of the to-be-measured signal light source, the cylindrical lens, the pair of long mirrors, the reference signal light source and the beam combining mirror, and improve the measurement capability of the light pulse signal processing system.

DETAILED DESCRIPTION OF THE EMBODIMENTS

In order to make the objectives, technical solutions and advantages of the present application more clear, the present application will be further described in detail below with reference to the accompanying drawings and embodiments. It should be understood that the specific embodiments described herein are merely intended to explain the present application and are not intended to limit the present application.

Figure 1:
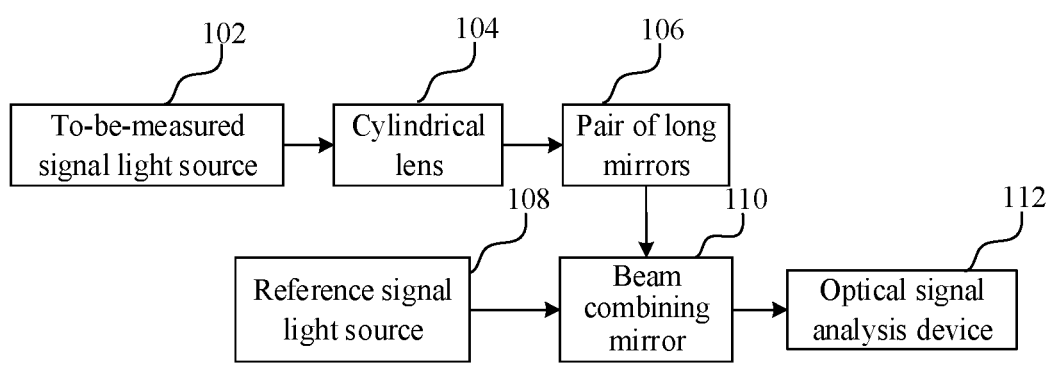
FIG. 1 is a schematic structural diagram of a light pulse signal processing system according to an embodiment.

In one embodiment, as shown in FIG. 1, a light pulse signal processing system is provided. The light pulse signal processing system may be implemented by providing a plurality of light signal processing devices. Specifically, the system may include: a to-be-measured signal light source 102, a cylindrical lens 104, a pair of long mirrors 106, and a reference signal light source 108 for generating a cluster of reference light pulses having a first repetition rate, and a beam combining mirror 110. The to-be-measured signal light source 102, the cylindrical lens 104, and the pair of long mirrors 106 may be in a state of being located in a same straight line, and the reference signal light source 108 and the beam combining mirror may also be in a state of being located in a same straight line. In one embodiment, the system may further include a light signal analysis device 112, and the light signal analysis device 112 may be associated with the beam combining mirror. The to-be-measured signal light source 102, the cylindrical lens 104, the pair of long mirrors 106, the reference signal light source 108 and the beam combining mirror 110 mentioned above may not be limited to the functions described in the description, and the to-be-measured signal light source 102, the cylindrical lens 104, the pair of long mirrors 106, the reference signal light source 108 and the beam combining mirror 110 mentioned above may also be used to realize other functions. The light pulse signal processing system mentioned above may include the following specific contents.

The to-be-measured signal light source 102 is configured to generate a to-be-measured signal light pulse and transmit the to-be-measured signal light pulse to the cylindrical lens 104.

The to-be-measured signal light source 102 may be a light source configured to generate a light pulse, which may be a to-be-measured signal light pulse, and the light pulse generated by the to-be-measured signal light source 102 may be a pulse signal having an ultra-narrow pulse width, where the ultra-narrow pulse width may be a femtosecond. The to-be-measured signal light source 102 may generate the to-be-measured signal light pulse with a preset pulse width, and transmit the to-be-measured signal light pulse to the cylindrical lens 104.

The cylindrical lens 104 is configured to convert the to-be-measured signal light pulse into a to-be-measured signal light pulse having a spatial angle chirp, so that the to-be-measured signal light pulse having the spatial angle chirp is incident on the pair of long mirrors 106 at different angles.

The to-be-measured signal light pulse may be the light pulse generated by the above-mentioned to-be-measured signal light source 102, and the light pulse may be a femtosecond-level light pulse and transmitted to the cylindrical lens. The cylindrical lens 104 may be a plano-convex cylindrical lens, and the cylindrical lens 104 may image in a line shape, which may be used to control a direction of a light beam. Specifically, the cylindrical lens 104 may convert the to-be-measured signal light pulse generated by the above-mentioned to-be-measured signal light source 102 into the to-be-measured signal light pulse having the spatial angle chirp, and the cylindrical lens 104 may further focus the to-be-measured signal light onto a horizontal line, and after introducing the spatial angle chirp, the to-be-measured signal light pulse having the spatial angle chirp may be incident into the pair of long mirrors 106.

The pair of long mirrors 106 is configured to delay the to-be-measured signal light pulse incident at different angles by means of inter-mirror reflection, and output the cluster of to-be-measured signal light pulses having a second repetition rate to the beam combining mirror 110. A rate difference between the second repetition rate and the first repetition rate is less than a set rate difference threshold.

The pair of long mirrors 106 may be composed of a plurality of lenses in a set form, and specifically, may be planar reflective mirrors with at least two mirrors arranged opposite to each other, and more specifically, may be a pair of planar reflective mirrors each having a length of 25 cm. The pair of long mirrors 106 may be configured to generate a cluster of light pulses with a preset repetition rate. The to-be-measured signal light pulse is focused on the horizontal line by the cylindrical lens 104, and the spatial angle chirp is introduced. The to-be-measured signal light pulse introduced with the spatial angle chirp, that is, the to-be-measured signal light pulse having the spatial angle chirp, may be construed as consisting of a plurality of light beams having a plurality of different incident angles. Since different light beams are incident into the pair of long mirrors at different angles, which will cause time delays increasing by multiplies to different light beams. Therefore, the to-be-measured signal light pulse may be incident into the pair of long mirrors 106 at different angles. Through the inter-mirror reflection of the pair of long mirrors 106, the to-be-measured signal light pulse is delayed, and the cluster of to-be-measured signal light pulses having a second repetition rate is outputted. The cluster of to-be-measured signal light pulses at the second repetition rate may further be transmitted to the beam combining mirror 110. The reference signal light source 108 mentioned above may be configured to generate a cluster of reference light pulses with a first repetition rate, for example, a high-repetition rate femtosecond pulse laser light source, and the light source may be a high stability pulse light source independently constructed. The difference between the second repetition rate mentioned above and the first repetition rate corresponding to the cluster of reference light pulses mentioned above may be less than a set rate difference threshold. Specifically, the second repetition rate may be $RR_S$=3.001 GHz, and the first repetition rate may be $RR_R$=3 GHZ, and at this time, the small rate difference between the two may be $\Delta f$=1 MHz.

The beam combining mirror 110 is configured to combine the cluster of to-be-measured signal light pulses with the cluster of reference light pulses generated by the reference signal light source 108, and the light signal analysis device 112 is configured to analyze the combined cluster of light pulses.

Figure 2:
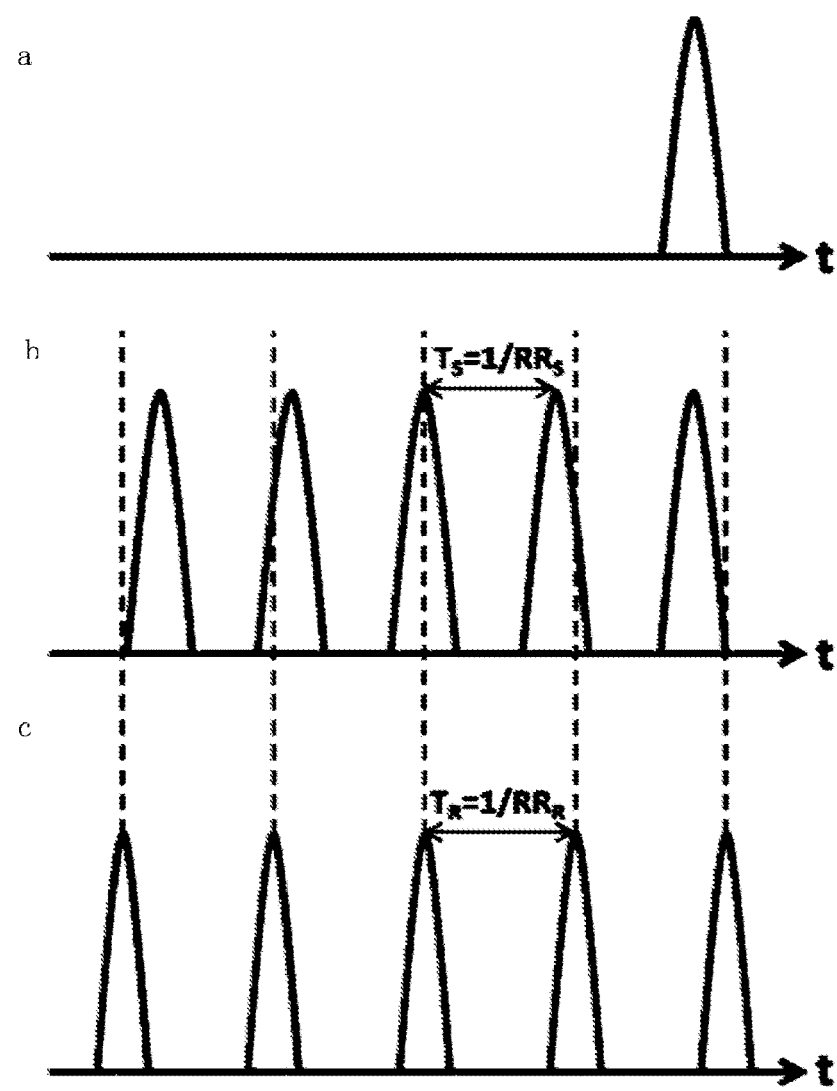
FIG. 2 is a schematic diagram illustrating results of a to-be-measured signal light pulse, a cluster of to-be-measured signal light pulses, and a cluster of reference light pulses according to an embodiment.

The reference signal light source 108 may generate the cluster of reference light pulses with a specific repetition rate, such as femtosecond pulse reference light. The cluster of reference light pulses may be used to perform full-optical domain real-time scanning on the cluster of to-be-measured signal light pulses. The beam combining mirror 110 may be a device configured to combine a plurality of light beams into one light beam, and for example, it may be a dichroic mirror or a spectroscope. The beam combining mirror 110 may combine the cluster of to-be-measured signal light pulses with the first repetition rate and the cluster of reference light pulses with the second repetition rate. Specifically, the cluster of to-be-measured signal light pulses with the repetition rate $RR_S$ may be combined with the reference light with the repetition rate $RR_R$. $RR_S$ and $RR_R$ may be different repetition frequencies. As shown in FIG. 2, FIG. 2 is a schematic diagram illustrating the results of the to-be-measured signal light pulse, the cluster of to-be-measured signal light pulses, and the cluster of reference light pulses according to an embodiment. As shown in figure a of FIG. 2, when the to-be-measured signal light pulse passes through the pair of long mirrors 106, since the to-be-measured signal light pulse is focused on the horizontal line and is introduced with the spatial angle chirp by the cylindrical lens 104, and different light beams are incident into the pair of long mirrors at different angles, time delays increasing by multiplies will be caused to different light beams, thereby generating the cluster of pulses as shown in figure b of FIG. 2. The repetition rate of the cluster of to-be-measured signal light pulses may be $RR_S$=3.001 GHz. This cluster of pulses may be combined with the cluster of reference light pulses with the repetition rate of $RR_R$=3 GHz. After the beam combining mirror 110 combines the plurality of clusters of light pulses mentioned above, the combined cluster of light pulses may further be transmitted to the light signal analysis device 112, and the light signal analysis device 112 may analyze the combined cluster of light pulses.

In the above embodiment, the to-be-measured signal light source generates the to-be-measured signal light pulse, and the to-be-measured signal light pulse is transmitted to the cylindrical lens. The to-be-measured signal light pulse is converted into the to-be-measured signal light pulse having the spatial angle chirp by the cylindrical lens. The to-be-measured signal light pulse having the spatial angle chirp is output and is incident into the pair of long mirrors at different angles. The to-be-measured signal light pulse incident at different incident angles is delayed by means of inter-mirror reflection through the pair of long mirrors. The cluster of to-be-measured signal light pulses with a corresponding repetition rate is outputted to the beam combining mirror. The cluster of to-be-measured signal light pulses and the cluster of reference light pulses are combined by the beam combining mirror. The light signal analysis device analyzes the combined cluster of light pulses. Compared with the conventional light splitting processing performed by using the FROG method, the present solution can realize the processing of the light pulse signal by means of a co-action of the to-be-measured signal light source, the cylindrical lens, the pair of long mirrors, the reference signal light source and the beam combining mirror, and improve the measurement capability of the light pulse signal processing system.

In one embodiment, the system further includes a unidirectional transmission mirror disposed between the to-be-measured signal light source 102 and the cylindrical lens 104. The unidirectional transmission mirror is configured to transmit the to-be-measured signal light pulse generated by the to-be-measured signal light source 102 to the cylindrical lens 104.

In this embodiment, the unidirectional transmission mirror may be a mirror configured for transmission on one side and for reflection on another side. The to-be-measured signal light pulse generated by the to-be-measured signal light source 102 may be transmitted to the cylindrical lens 104 through the transmission side of the unidirectional transmission mirror.

In addition, in another embodiment, the pair of long mirrors 106 may be further configured to transmit the cluster of to-be-measured signal light pulses to the unidirectional transmission mirror through the cylindrical lens 104, so that the unidirectional transmission mirror reflects the cluster of to-be-measured signal light pulses to the beam combining mirror 110. Specifically, after the to-be-measured signal light pulse generated by the to-be-measured signal light source 102 mentioned above is transmitted to the cylindrical lens 104 through the transmission side of the unidirectional transmission mirror, the cylindrical lens 104 may focus the to-be-measured signal light pulse onto a horizontal line and introduce the spatial angle chirp to the to-be-measured signal light pulse, and the to-be-measured signal light pulse having the introduced spatial angle chirp is incident on the pair of long mirrors 106. The pair of long mirrors 106 may cause time delays increasing by multiplies to the to-be-measured signal light pulse having the angle chirp. Thus, the cluster of to-be-measured signal light pulses is generated, and the pair of long mirrors 106 can return the cluster of to-be-measured signal light pulses to the cylindrical lens 104 mentioned above, and the cluster of to-be-measured signal light pulses is transmitted to the reflection side of the unidirectional transmission mirror through the cylindrical lens 104. In this way, the unidirectional transmission mirror may reflect the cluster of to-be-measured signal light pulses to the beam combining mirror 110 mentioned above.

Through the present embodiment, the to-be-measured signal light pulse can be transmitted and reflected through the unidirectional transmission mirror, thereby providing a basis for the combining of the beam combining mirror 110, and thus improving the measurement capability of the light pulse processing system.

In one embodiment, the light signal analysis device 112 includes a nonlinear crystal. The nonlinear crystal is configured to convert the combined cluster of light pulses obtained by the beam combining mirror 110 into sum-frequency light for analysis by the light signal analysis device 112.

In this embodiment, the beam combining mirror 110 may combine the cluster of to-be-measured signal light pulses reflected by the unidirectional transmission mirror with the cluster of reference light pulses generated by the reference signal light source 108 to obtain the combined cluster of light pulses. The beam combining mirror 110 may transmit the combined cluster of light pulses to the light signal analysis device 112. The light signal analysis device 112 may be a device configured for analyzing the cluster of light pulses, such as analyzing the cluster of light pulses in a time domain and a frequency domain, or analyzing the phrase and intensity of the cluster of light pulses. The light signal analysis device 112 may include the nonlinear crystal. The nonlinear crystal may be configured to convert the combined cluster of light pulses obtained by the beam combining mirror 110 into sum-frequency light. Specifically, the cluster of to-be-measured signal light pulses with the repetition rate $RR_S$ may be combined with the cluster of reference light pulses with the repetition rate $RR_R$ and then be inputted into the nonlinear crystal, thereby causing a second-order non-linear effect, and generating the sum-frequency light. After the sum-frequency process of the nonlinear crystal, a time domain expression of the generated sum-frequency signal is:

$$E_{SHG}(z_0,t,\tau) \propto E\ s(t)E(t-\tau)$$

E(t) is a time domain expression of the to-be-measured signal light, E(t−τ) is a time domain expression of the reference light, z is a dispersion length of the sum-frequency light pulse in a time-domain stretching device, $z_0$=0, and τ is a time delay between the reference light and the to-be-measured signal light. For different nonlinear effects, the expressions of nonlinear signals generated through the nonlinear crystals are different, thus forming FROGs with different experimental structures.

With the present embodiment, the cluster of to-be-measured signal light pulses may be combined with the cluster of reference light pulses, and converted into sum-frequency light through the nonlinear crystal, thereby achieving the effect of improving the measurement capability of the light pulse signal processing system.

In one embodiment, the light signal analysis device 112 further includes a time-domain stretching device. The time-domain stretching device is configured to perform time-frequency conversion processing on the sum-frequency light obtained by the nonlinear crystal, for analyzing, by the light signal analysis device 112, the sum-frequency light signal obtained after the time-frequency conversion processing.

In this embodiment, the time-domain stretching device may be a device for performing time-frequency conversion, for example, may be a volume grating. After the nonlinear crystal generates the sum-frequency light for the combined cluster of light pulses, the sum-frequency light may be transmitted to the time-domain stretching device. The time-domain stretching device may perform time-frequency conversion processing to the sum-frequency light, that is, the frequency domain information of the sum-frequency light may be mapped to the time domain. Specifically, Fourier transformation may be performed on the time domain expression of the frequency multiplied signal to obtain the frequency domain expression:

$$\tilde{E}_{SHG}(z_0,\omega,\tau) \propto \int_{-\infty}^{+\infty} E_{SHG}(z_0,t,\tau)\exp(-i\omega t)dt.$$

After the sum-frequency light signal passes through the time-domain stretching device, the frequency domain information is mapped to the time domain:

$$|E_{SHG}(z, t, \tau)|^2 = \frac{2}{\pi\beta_2 z}e^{-\alpha z}|\tilde{E}_{SHG}(z_0, \omega, \tau)|^2.$$

$\beta_2$ is the dispersion coefficient of the grating, a is the attenuation coefficient of the grating. It can be seen from the above expression that the pulse time domain envelope shape after dispersion has a similarity with the original spectral envelope shape, and the time-frequency correspondence satisfies:

$$\omega = \frac{t}{\beta_2 z}.$$

With the present embodiment, the sum-frequency light can be time-frequency converted by the time-domain stretching device and further analyzed by the light signal analysis device 112, thereby achieving the effect of improving the measurement capability of the light pulse signal processing system.

In one embodiment, the light signal analysis device 112 further includes a first lens disposed between the beam combining mirror 110 and the nonlinear crystal. The first lens is configured to focus the combined cluster of light pulses obtained by the beam combining mirror 110 to the linear crystal.

In this embodiment, the light signal analysis device 112 may further include the first lens disposed before the nonlinear crystal mentioned above, and may be configured to converge the combined cluster of light pulses and transmit the combined cluster of light pulses to the nonlinear crystal, so that the nonlinear crystal generates the sum-frequency light.

In another embodiment, the light signal analysis device 112 further includes a second lens disposed between the nonlinear crystal and the time-domain stretching device. The second lens is configured to collimate the sum-frequency light obtained from the nonlinear crystal and couple the sum-frequency light obtained from the nonlinear crystal to the time-domain stretching device.

In the present embodiment, the light signal analysis device 112 may further include the second lens, which may be disposed before the time-domain stretching device mentioned above and disposed after the nonlinear crystal, and may be configured to collimate the sum-frequency light obtained from the nonlinear crystal and couple the sum-frequency light obtained from the nonlinear crystal into the time-domain stretching device, so that the time-domain stretching device performs time-frequency conversion.

With the above embodiments, by providing the first lens and the second lens, the combined cluster of light pulses can be converged, collimated and coupled respectively, thereby achieving the effect of improving the measurement capability of the light pulse signal processing system.

In one embodiment, the signal analysis device further includes a photodetector. The photodetector is configured to detect the time-frequency conversion processed sum-frequency light signal outputted by the time-domain stretching device, and convert it into a corresponding electrical signal.

In this embodiment, the photodetector may be a device configured for performing electrical signal conversion, for example, may be a high-speed photodetector. Specifically, the photodetector may acquire the time-frequency conversion processed sum-frequency light signal outputted by the time-domain stretching device, and may convert this sum-frequency light signal into the corresponding electrical signal, and may further transmit the converted electrical signal to other devices in the light signal analysis device 112 for detection.

With this embodiment, the time-frequency conversion processed sum-frequency light signal may be converted by the photodetector into the corresponding electrical signal, so that other devices, such as sampling devices, can perform analysis based on the electrical signal, thereby achieving the effect of improving the measurement capability of the light pulse signal processing system.

In one embodiment, the light signal analysis device 112 further includes a sampling device. The sampling device is configured to perform data acquisition on the electrical signal obtained by the photodetector, and acquire a scanning trajectory diagram, which is used for acquiring the intensity and the phase of the to-be-measured signal light pulse in the time domain and/or the frequency domain by a generalized projection method.

Figure 3:
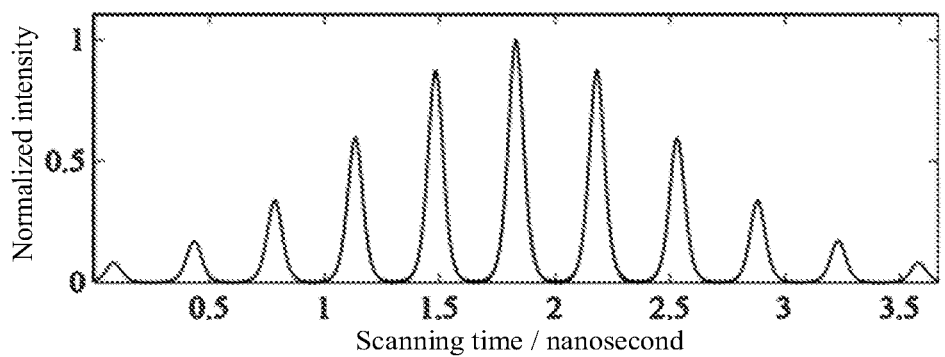
FIG. 3 is a schematic diagram of a trajectory of a time-frequency converted sum-frequency light measured by an oscilloscope according to an embodiment.

In this embodiment, the sampling device may be a device for acquiring real-time data on the electrical signal generated by the photodetector, for example, a high-speed sampling device. Specifically, the sampling device may perform real-time data acquisition on the electrical signal obtained by the photodetector, for example, real-time measurement and analysis may be performed on the time-frequency converted sum-frequency spectrum, to obtain a scanning trajectory diagram. As shown in FIG. 3, FIG. 3 is a schematic diagram of a trajectory of the time-frequency converted sum-frequency light measured by the oscilloscope according to one embodiment, and may also be referred to as a scanning trajectory diagram. It is also possible to analyze and inverse the scanning trajectory diagram by the generalized projection method to obtain full-field information in the time domain and the frequency domain of the intensity, the phase, and the like of the to-be-measured light signal, so as to realize real-time measurement of the full-field information of the ultrafast signal. The scanning trajectory diagram is obtained by using the high-speed photodetector and the high-speed sampling device, and the corresponding intensity may be expressed as:

$$I_{FROG}^{SHG}(\omega,\tau)=|\int_{-\infty}^{+\infty}E_{SHG}(z,t,\tau)\exp(-i\omega t)dt|^2=|\tilde{E}_{SHG}(z,t/\beta_2 z,\tau)|^2.$$

Figure 4:
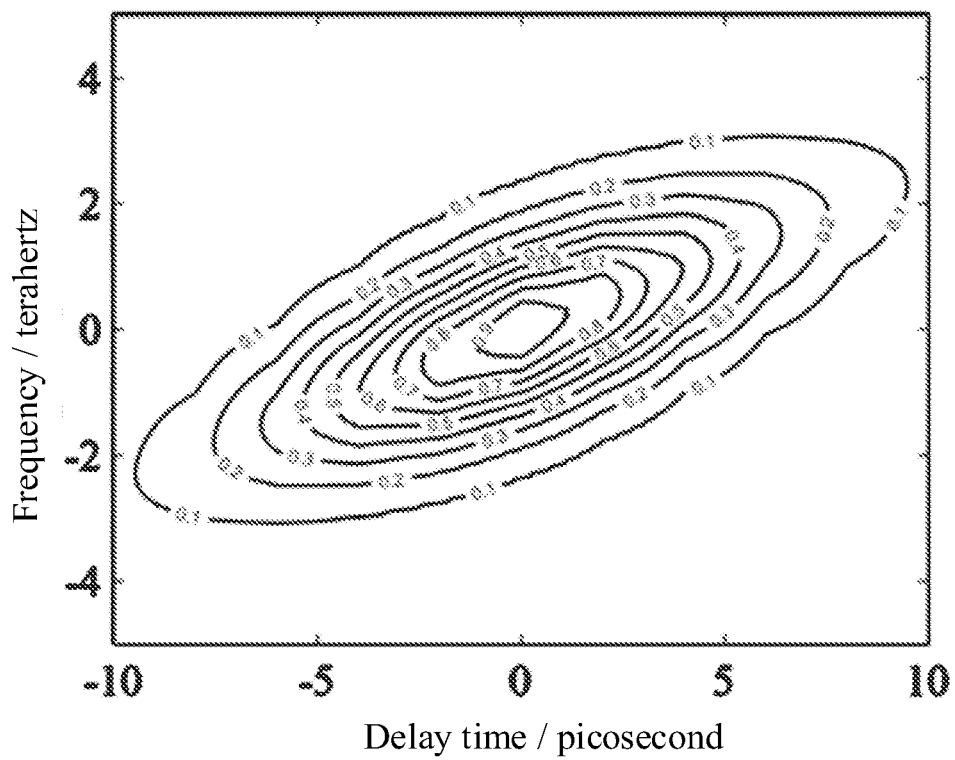
FIG. 4 is a schematic diagram illustrating a result of processing the trajectory of the sum-frequency light according to an embodiment.
Figure 5:
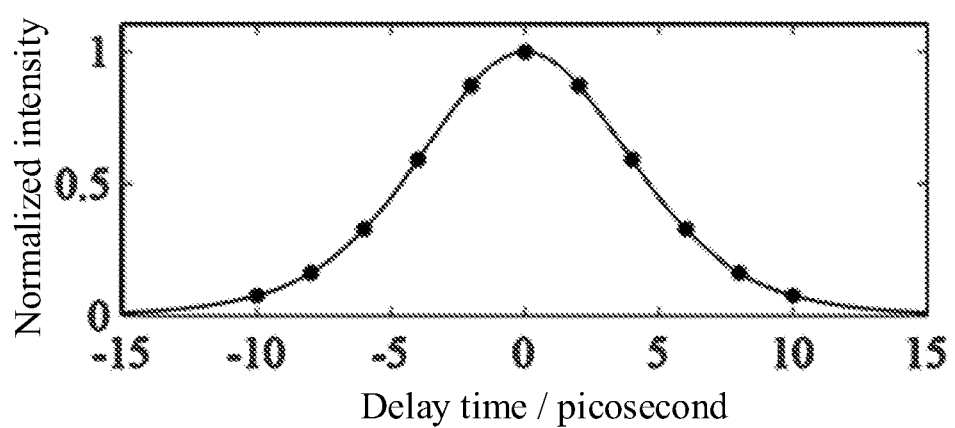
FIG. 5 is a schematic diagram illustrating a result of an intensity of a to-be-measured signal light pulse according to an embodiment.
Figure 6:
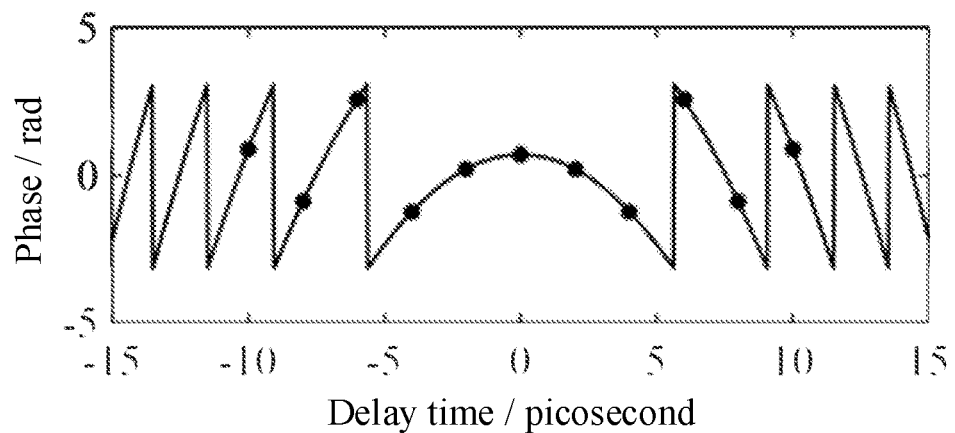
FIG. 6 is a schematic diagram illustrating a result of a phase of a to-be-measured signal light pulse according to an embodiment.

The scanning trajectory diagram of the trajectory of the time-frequency converted sum-frequency light measured by the high-speed sampling device may be as shown in FIG. 3. In addition, as shown in FIG. 4, FIG. 4 is a schematic diagram illustrating the result of processing the trajectory of the sum-frequency light according to an embodiment. FIG. 4 may be a diagram obtained after perform processing based on the time-frequency converted sum-frequency light, and may also be referred to as a time-frequency two-dimensional contour map. The time-frequency two-dimensional contour map may be a two-dimensional contour map obtained by processing the time-frequency converted sum-frequency light through the oscilloscope. This processing may be completed by the light signal analysis device 112 or may be completed by a computer device. After the time domain stretching device performs time-frequency conversion on the above-described sum-frequency light, the time-frequency converted sum-frequency light may be input to the light signal analysis device 112 for analysis, for example, may be input to the high-speed photodetector in the light signal analysis device 112 for analysis. The intensity of the to-be-measured signal light pulse obtained after detecting and processing the electrical signal corresponding to the to-be-measured signal light pulse may be as shown in FIG. 5. FIG. 5 is a schematic diagram of a result of the intensity of the to-be-measured signal light pulse according to an embodiment. The phase of the to-be-measured signal light pulse obtained after detecting and processing the electrical signal corresponding to the to-be-measured signal light pulse may be as shown in FIG. 6. FIG. 6 is a schematic diagram illustrating a result of the phase of the to-be-measured signal light pulse according to an embodiment.

With this present embodiment, the light signal analysis device may analyze the electrical signal corresponding to the to-be-measured signal light pulse by using the sampling device to obtain various information, such as a corresponding scanning trajectory diagram, intensity and/or phase, thereby implementing information detection on the to-be-measured signal light pulse, and also achieving the effect of improving the measurement capability of the light pulse signal processing system.

Figure 7:
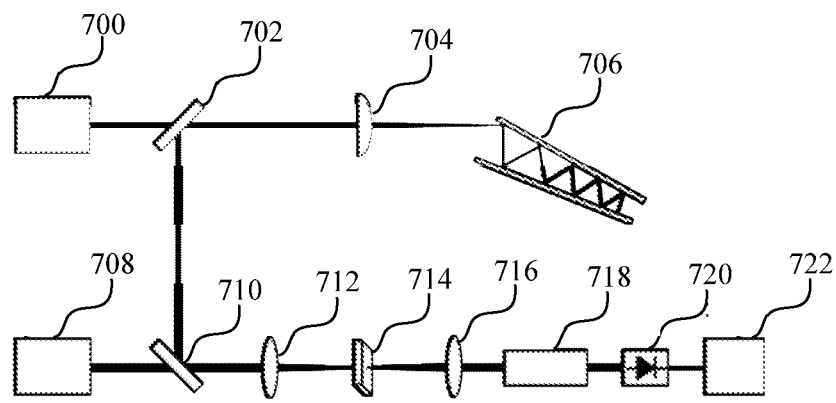
FIG. 7 is a schematic structural diagram of a light pulse signal processing system according to another embodiment.

In one embodiment, as shown in FIG. 7, FIG. 7 is a schematic structural diagram of a light pulse signal processing system according to another embodiment. The light pulse signal processing system may include a to-be-measured signal light source 700, a unidirectional transmission mirror 702, a cylindrical lens 704, a pair of long mirrors 706, a high-repetition rate femtosecond pulse laser light source 708, a beam combining mirror 710, a first lens 712, a second lens 716, a nonlinear crystal 714, a time-domain stretching device 718, a high-speed photodetector 720, and a high-speed sampling device 722.

In this embodiment, the to-be-measured signal light pulse generated by the to-be-measured signal light source 700 may be a pulse signal having an ultra-narrow pulse width. The unidirectional transmission mirror 702 may be configured to transmit the to-be-measured signal light pulse generated by the to-be-measured signal light source 700 to the cylindrical lens 704. The cylindrical lens 704 may be configured to focus the to-be-measured signal light pulse generated by the to-be-measured signal light source 700 on a horizontal line, and introduce a spatial angle chirp to the to-be-measured signal light pulse, and incident the to-be-measured signal light pulse having the spatial angle chirp into the pair of long mirrors 706. The pair of long mirrors 706 is configured to reflect the incident to-be-measured signal light pulses having the angle chirp multiple times in correlation with the angels to increase the angle chirp, and generate and replicate a high-repetition rate pulse cluster with a fixed time delay. The high-repetition rate femtosecond pulse laser light source 708 outputs a femtosecond pulse reference light having a high-repetition rate, for scanning the to-be-measured signal light pulse in full-optical domain in real time. The beam combining mirror 710 may be a dichroic mirror or a spectroscope, and is configured to combine the to-be-measured signal light pulse and the reference light pulse. There may be two lenses. The first lens 712 may be located before the nonlinear crystal, and the second lens 716 may be located behind the nonlinear crystal, and the two lenses are respectively configured to converge the light beams to the nonlinear crystal to generate the sum-frequency light, and collimate and couple the output light into the time-domain stretching device. The nonlinear crystal 714 is configured to perform a nonlinear action on the to-be-measured signal light pulse and the reference light pulse, so as to generate the sum-frequency light. The present invention adopts a second-order nonlinear crystal to output the sum-frequency light. The time-domain stretching device 718 is configured to perform time-frequency conversion on the sum-frequency light and map the frequency domain information of the sum-frequency light to the time domain. The high-speed photodetector 720 is configured to convert the time-frequency converted sum-frequency light signal into the electrical signal. The high-speed sampling device 722 is configured to perform real-time data acquisition on the electrical signal generated by the high-speed photodetector.

After one pulse in the to-be-measured signal light pulse generated by the to-be-measured signal light source 700 passes through the cylindrical lens 704 and the pair of long mirrors 706, by using the spatial angle chirp generated by the cylindrical lens 704 and an enhancement effect of the pair of long mirrors 706 on the spatial angle chirp, different time delays are generated by continuous reflections, thereby duplicating a cluster of pulses with a repetition rate of $RR_S$. The cluster of to-be-measured signal light pulses with the repetition rate of $RR_S$ and the cluster of reference light pulses with the repetition rate of $RR_R$ are combined and then inputted into the nonlinear crystal 714 to cause a second-order nonlinear effect, to generate the sum-frequency light. The frequency domain information of the sum-frequency light maps is mapped to the time domain through the time-domain stretching device.

Real-time measurement and analysis are performed on the time-frequency converted sum-frequency light spectrum using the high-speed photodetector 720 and the high-speed sampling device 722, to obtain the scanning trajectory diagram.

The scanning trajectory diagram is analyzed and inversed using the generalized projection method to obtain full-field information in the time domain and the frequency domain of the intensity, the phase, and the like of the to-be-measured light signal, so as to realize real-time measurement of the full-field information of the ultrafast signal.

The repetition rate $RR_S$ of the cluster of to-be-measured signal light pulses is adjusted by adjusting the angles of the to-be-measured signal incident on the pair of long mirrors 706.

The cluster of reference light pulses is a high-repetition rate femtosecond pulse laser with a repetition rate $RR_R$ in a level of GHz. The relationship between $RR_S$ and $RR_R$ is $RR_S - RR_R = \Delta f$, $\Delta f$ is in a level of MHz. The cluster of reference light pulses may be used to perform the full-optical domain real-time scanning in the time domain on the to-be-measured signal light pulse based on the rate difference $\Delta f$.

According to the present embodiment, the to-be-measured signal light source generates the to-be-measured signal light pulse, and the to-be-measured signal light pulse is transmitted to the cylindrical lens. The to-be-measured signal light pulse is converted into the to-be-measured signal light pulse having the spatial angle chirp by the cylindrical lens. The to-be-measured signal light pulse having the spatial angle chirp is output and is incident into the pair of long mirrors at different angles. The to-be-measured signal light pulse incident at different incident angles is delayed by means of inter-mirror reflection by using the pair of long mirrors. The cluster of to-be-measured signal light pulses with a corresponding repetition rate is outputted to the beam combining mirror. The cluster of to-be-measured signal light pulses and the cluster of reference light pulses are combined by the beam combining mirror. The light signal analysis device analyzes the combined cluster of light pulses. Compared with the conventional light splitting processing performed by using the FROG method, the present solution can realize the processing of the light pulse signal by means of a co-action of the to-be-measured signal light source, the cylindrical lens, the pair of long mirrors, the reference signal light source and the beam combining mirror, and improve the measurement capability of the light pulse signal processing system.

The respective technical features of the above embodiments can be combined arbitrarily. For brevity of description, not all possible combinations of the respective technical features in the above-described embodiments are described. However, as long as there is no contradiction in the combination of these technical features, it should be considered as within the scope of description of this specification.

The above embodiments merely express several embodiments of the present application, and the description thereof is more specific and detailed, but cannot be construed as limiting the scope of the present invention. It should be noted that, for a person of ordinary skill in the art, several modifications and improvements can also be made without departing from the concept of the present application, which all belong to the scope of protection of the present application. Therefore, the scope of protection of the present application should be decided by the appended claims.

What is claimed is:

1. A light pulse signal processing system, comprising: a reference signal light source configured to generate a cluster of reference light pulses having a first repetition rate, a beam combining mirror, a to-be-measured signal light source, a cylindrical lens, and a pair of long mirrors; wherein, the to-be-measured signal light source is configured to generate a to-be-measured signal light pulse and transmit the to-be-measured signal light pulse to the cylindrical lens;

the cylindrical lens is configured to convert the to-be-measured signal light pulse into a to-be-measured signal light pulse having a spatial angle chirp, so that the to-be-measured signal light pulse having the spatial angle chirp is incident on the pair of long mirrors at different angles;

the pair of long mirrors is configured to delay the to-be-measured signal light pulse incident at different angles by means of inter-mirror reflection, and to output a cluster of to-be-measured signal light pulses having a second repetition rate to the beam combining mirror; wherein a rate difference between the second repetition rate and the first repetition rate is less than a set rate difference threshold; and the beam combining mirror is configured to combine the cluster of to-be-measured signal light pulses with the cluster of reference light pulses generated by the reference signal light source, for a light signal analysis device to analyze the combined cluster of light pulses.

2. The system according to claim 1, further comprising: a unidirectional transmission mirror disposed between the to-be-measured signal light source and the cylindrical lens;

wherein the unidirectional transmission mirror is configured to transmit the to-be-measured signal light pulse generated by the to-be-measured signal light source to the cylindrical lens.

3. The system according to claim 2, wherein the pair of long mirrors is further configured to transmit the cluster of to-be-measured signal light pulses to the unidirectional transmission mirror through the cylindrical lens, so that the unidirectional transmission mirror reflects the cluster of to-be-measured signal light pulses to the beam combining lens.

4. The system according to claim 1, wherein the pair of long mirrors comprises at least two planar reflective mirrors arranged opposite to each other.

5. The system according to claim 1, wherein the light signal analysis device comprises a nonlinear crystal; and wherein the nonlinear crystal is configured to convert the combined cluster of light pulses obtained by the beam combining mirror into sum-frequency light, for the light signal analysis device to analyze the sum-frequency light.

6. The system according to claim 5, wherein the light signal analysis device further comprises a time-domain stretching device; and wherein the time-domain stretching device is configured to perform time-frequency conversion processing on the sum-frequency light obtained by the nonlinear crystal to obtain a time-frequency converted sum-frequency light signal, for the light signal analysis device to analyze the time-frequency converted sum-frequency light signal.

7. The system according to claim 6, wherein the light signal analysis device further comprises a first lens disposed between the beam combining mirror and the nonlinear crystal; and wherein the first lens is configured to focus the combined cluster of light pulses obtained by the beam combining mirror to the nonlinear crystal.

8. The system according to claim 6 or 7, wherein the light signal analysis device further comprises a second lens disposed between the nonlinear crystal and the time-domain stretching device;

wherein the second lens is configured to collimate the sum-frequency light obtained from the nonlinear crystal and couple the sum-frequency light obtained from the nonlinear crystal to the time-domain stretching device.

9. The system according to claim 8, wherein the light signal analysis device further comprises: a photodetector; and wherein the photodetector is configured to detect the time-frequency converted sum-frequency light signal output by the time-domain stretching device, and convert the time-frequency converted sum-frequency light signal into a corresponding electrical signal.

10. The system according to claim 9, wherein the light signal analysis device further comprises a sampling device;

wherein the sampling device is configured to perform data acquisition on the electrical signal obtained by the photodetector to obtain a scanning trajectory diagram, and the scanning trajectory diagram is configured for obtaining an intensity and a phase of the to-be-measured signal light pulse in a time domain and/or a frequency domain by a generalized projection method.

* * * * *